United States Patent [19]

Propst et al.

[11] 4,235,495

[45] Nov. 25, 1980

[54] ENERGY SUPPLY SYSTEM INCLUDING FLAT POWER CABLES FOR A SPACE DIVIDER SYSTEM

[75] Inventors: Robert L. Propst, Ann Arbor; Michael A. Wodka, Ypsilanti, both of Mich.

[73] Assignee: Herman Miller, Inc., Zeeland, Mich.

[21] Appl. No.: 38,535

[22] Filed: May 14, 1979

[51] Int. Cl.³ .............................................. H02G 3/28
[52] U.S. Cl. .................................... 339/22 R; 339/23; 174/101
[58] Field of Search ................. 339/17 F, 22 R, 22 B, 339/23, 21 R; 174/48, 49, 101

[56] References Cited

U.S. PATENT DOCUMENTS

| | | | |
|---|---|---|---|
| 3,218,596 | 11/1965 | Oehlerking et al. | 339/22 R |
| 3,911,637 | 10/1975 | Schmidiger | 339/23 |
| 4,043,626 | 8/1977 | Propst et al. | 339/23 |

*Primary Examiner*—Neil Abrams
*Attorney, Agent, or Firm*—Olsen and Stephenson

[57] ABSTRACT

An energy supply system for transmitting electrical energy in a space divider system comprised of a plurality of upright wall panels arranged end-to-end on a floor. The energy supply system includes a compartment located adjacent to the lower edge of each wall panel and extending longitudinally between the upright ends of the wall panel. A flat cable unit comprised of a plurality of flat side-by-side conductors embedded in an insulating medium having a rectangular cross sectional configuration is disposed in the compartment and extends between the ends of the wall panel. The flat cable unit includes a pair of connector asemblies connected to the conductors at opposite ends of the flat cable unit and disposed adjacent the lower edge of the wall panel near its upright ends enabling the connection of the flat cable unit to a similar flat cable unit associated with an adjacent wall panel. Consequently, a plurality of interconnected flat cable units provide for the distribution of power throughout the space divider system.

7 Claims, 8 Drawing Figures

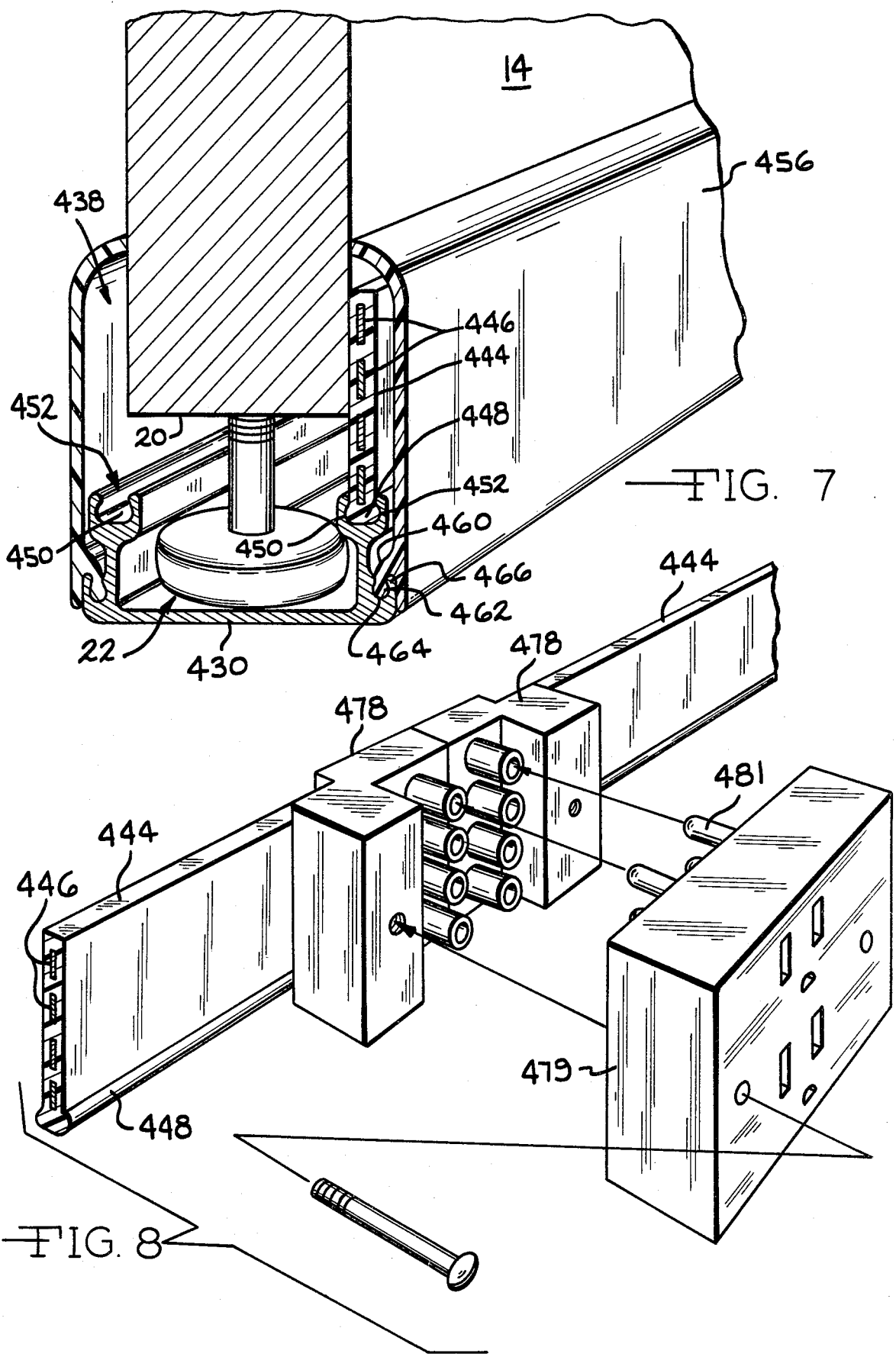

ENERGY SUPPLY SYSTEM INCLUDING FLAT POWER CABLES FOR A SPACE DIVIDER SYSTEM

BACKGROUND OF THE INVENTION

The present invention relates generally to space divider systems consisting of a plurality of movable, upright wall panels, and more particularly, to an improved energy supply system installed along the lower edges of the wall panels in the space divider system. Because space divider systems consist of portable wall panels which are readily interconnected to form desired work station configurations, they afford the user high flexibility in arranging and rearranging work stations to meet changing work situations. Delivery of the necessary power and communications service to the various work stations in normally accomplished in one of two methods. Either each wall panel is prewired or an energy supply and communications system is installed at the bases of the wall panels. Prewired wall panels are relatively expensive and if some of the prewired panels are erected in a work station where power and communications services are not needed, those panels are being underutilized. Under-the-wall energy supply systems are also popular. One reason for their popularity is that they can readily be interfaced with conventional panels. Thus, space divider systems lacking an under-the-wall energy supply system can be retrofitted with such a system without unnecessary additional expense.

Efficient utilization of the available space adjacent the lower edges of the wall panels is a primary consideration in the design of under the wall energy supply and communications distributions systems. Also, it is important that access to the power cables and the communication lines be readily available both for installation and maintenance purposes.

In U.S. Pat. No. 4,043,626, assigned to the assignee of the present application, an under-the-wall distribution system is disclosed which utilizes separated flat insulated conductors extending length wise through longitudinal openings in floor tracks positioned beneath the wall panels to convey electrical power along the bases of the wall panels. Although the power distribution system disclosed in this patent effectively lowered the profile of the baseboard construction, it remained difficult to assemble and service the power distribution system. Each individual connector had to be threaded through on of the longitudinal openings in the track. Assembly was time consuming and maintenance difficult.

It is the general object of this invention, therefore, to provide an energy supply system for a space divider system in which flat cable units are employed to transmit power throughout the space divider system.

It is another object of this invention to provide an energy supply system in which access is easily gained to the flat cable units.

It is another object of this invention to provide an energy supply system including flat cable units having low profile connector assemblies compatible with the low profile construction of the flat cable units.

SUMMARY OF THE INVENTION

In accordance with the present invention, an energy supply system is provided for use in a space divider system comprised of a plurality of upright wall panels arranged end-to-end on a supporting surface. The energy supply system includes flat cable units comprised of flat side-by-side conductors disposed in a suitable insulating medium whereby the cable unit has a flat rectangular cross-sectional configuration. Compartments are formed adjacent the lower edges of the wall panels to house the flat cable units each of which extends adjacent the lower edge of an associated wall panel between the panel's upright ends. Each flat cable unit also includes connector assemblies provided at its opposite ends enabling a plurality of flat cable units to be interconnected.

Track members are interposed between the upright wall panels and the floor to support the upright wall panels in positions in which their lower edges are spaced above the floor. In one embodiment, a longitudinally extending channel is formed in the bottom surface of each track member to define a compartment in which a flat cable unit is disposed. The flat cable units are laid on the floor and extend upwardly into the channels where they are concealed. The connector assemblies of each flat cable unit are located at opposite ends of an associated track member which has a length substantially equal to the length of the wall panel which it supports. The connector assemblies on adjacent flat cable units are interfitted to electrically connect the flat cable units thereby providing electrical power throughout the space divider system.

In another embodiment, an undercover plate overlies the downwardly opening channel in the track and is engageable with the track to enclose the compartment containing the flat cable. The track member and flat cable then can be moved as a single unit.

In another embodiment, the flat cable unit is positioned on its side so as to extend upwardly from the track to a position above the lower edge of its associated wall panel. Side cover members are provided to define a compartment between the lower edge of each wall panel and the track in which the flat cable unit plus communications lines are disposed.

Further objects, features and advantages of the present invention will become apparent from a consideration of the following description when taken in connection with the appended claims and the following drawing in which:

FIG. 7 is a perspective sectional view of an upright wall panel and a modified form of the energy supply system of this invention in which the flat cable units are mounted on their sides; and FIG. 8 is a perspective view of a pair of side mounted flat cable units having connector assemblies positioned end-to-end and showing a jumper connector for electrically interconnecting the flat cable units.

Figure 1:
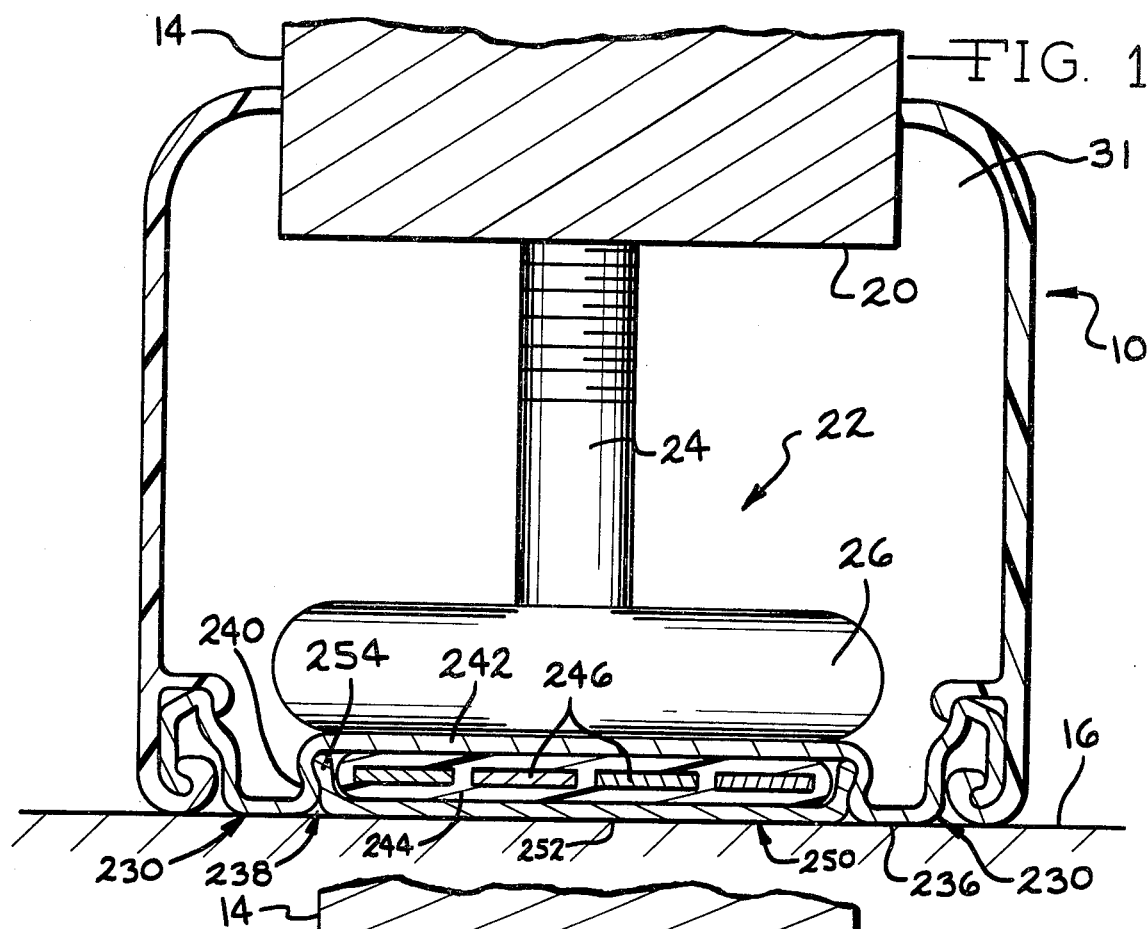
FIG. 1 is a sectional view of an upright wall panel showing a flat cable unit of the present invention positioned in a compartment below the wall panel.
Figure 4:
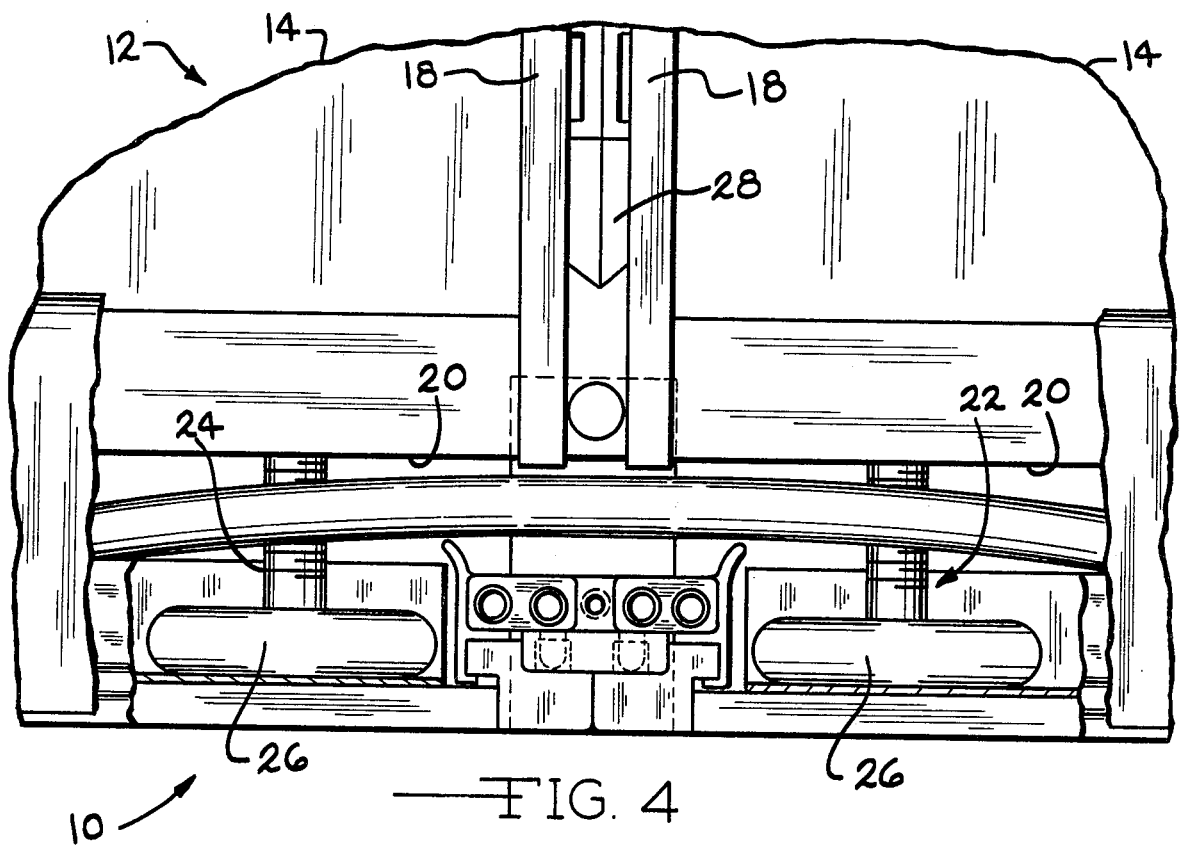
FIG. 4 is a front elevational view of a pair of connected wall panels showing interconnected flat cable units positioned adjacent the lower edges of the wall panels.
Figure 6:
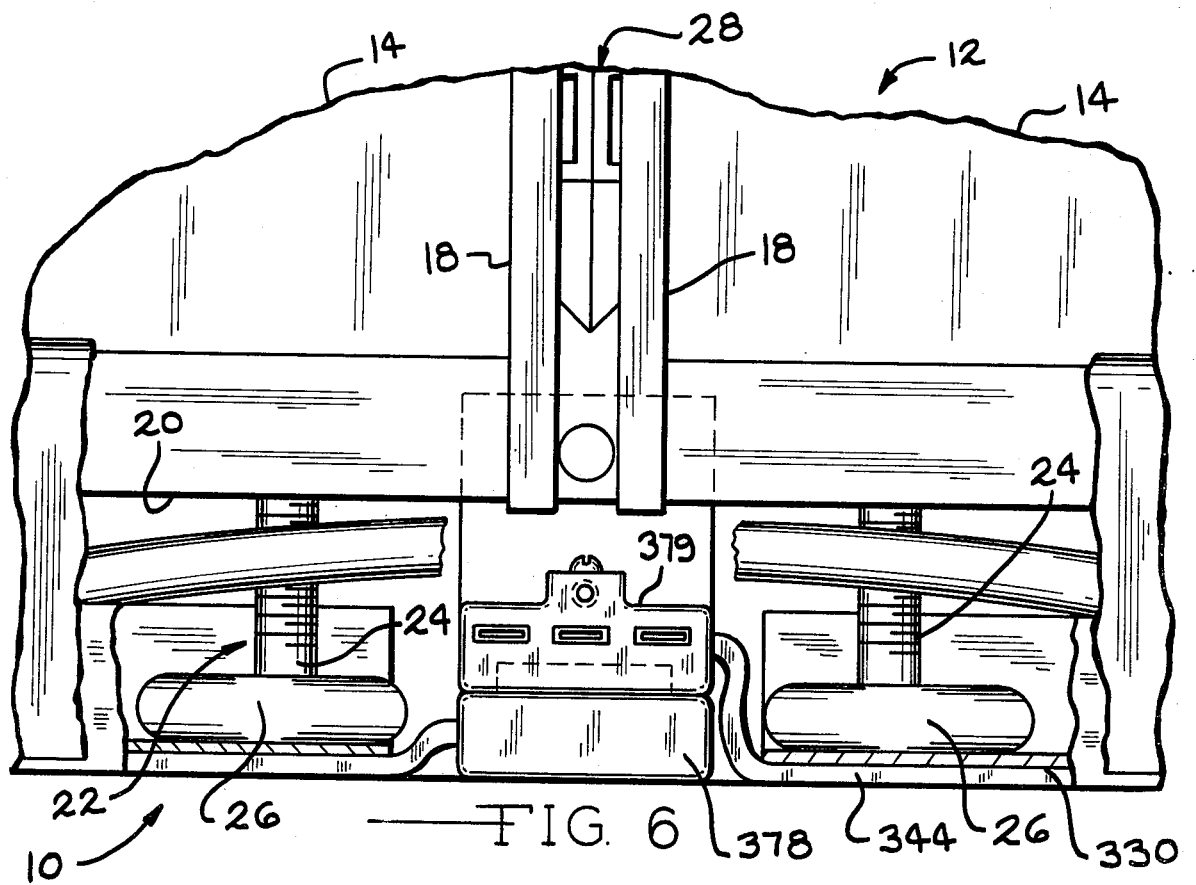
FIG. 6 is a front elevational view of a pair of interconnected wall panels below which are connected the pair of flat cable units shown in FIG. 5.

Referring to the drawing, the energy supply system of this invention, indicated generally at 10, is shown in FIGS. 1, 4 and 6 installed in a space divider system 12 comprised of a plurality of upright wall panels 14 arranged end-to-end on a supporting surface such as the floor 16. Each upright wall panel 14 has opposite upright ends 18 and a lower edge 20 from which depending leg supports 22 extend downwardly. Each leg support 22 includes a threaded spindle 24 threadably mounted on its associated panel 14 and a glide 26 mounted on the spindle 24. The spindle 24 is threadably mounted in the panel 14 at the lower edge 20 enabling the height of the panel 14 to be varied through relative rotation of the spindle 24 with respect to the panel 14. Connector joints 28 (FIGS. 4 and 6) mount on the adjacent upright ends 18 of the wall panels 14 to interconnect a pair of end-to-end panels 14 to form the space divider system 12.

Figure 2:
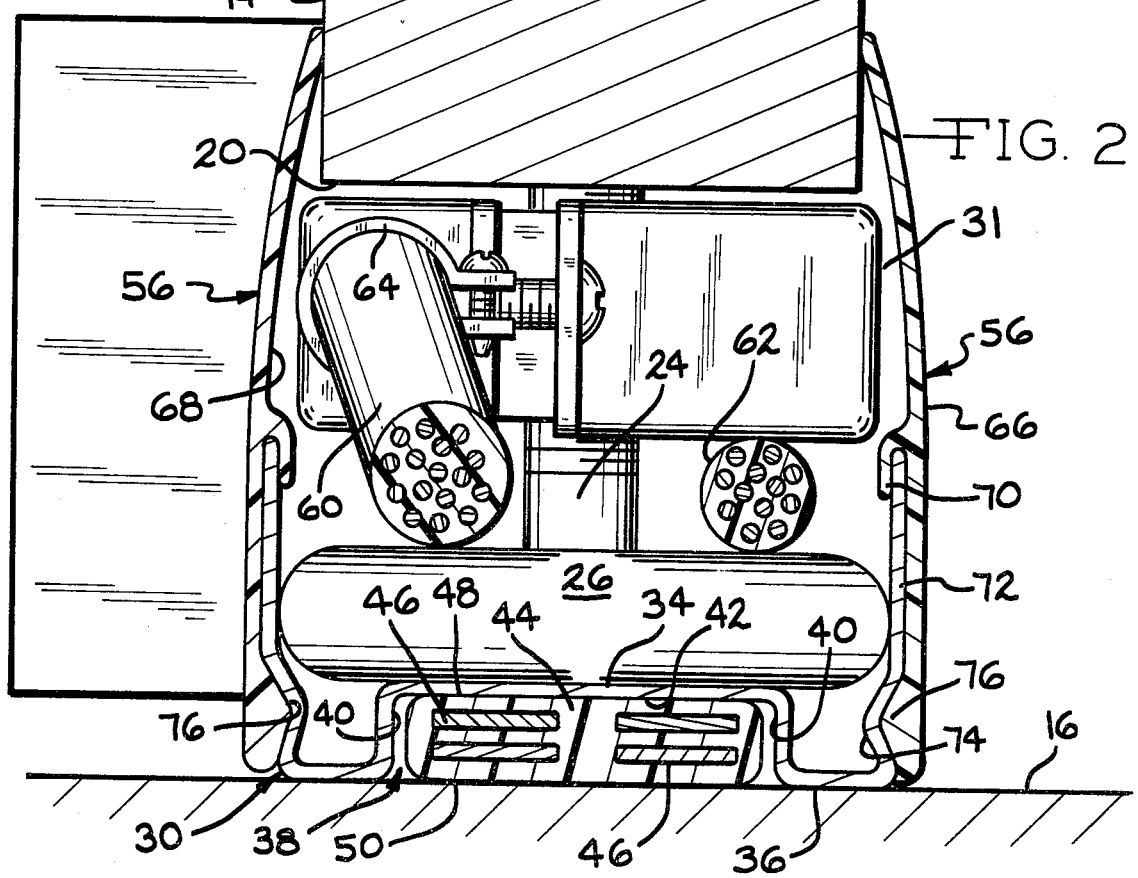
FIG. 2 is a sectional view of a wall panel illustrating the energy supply system of this invention incorporating a modified flat cable unit.
Figure 3:
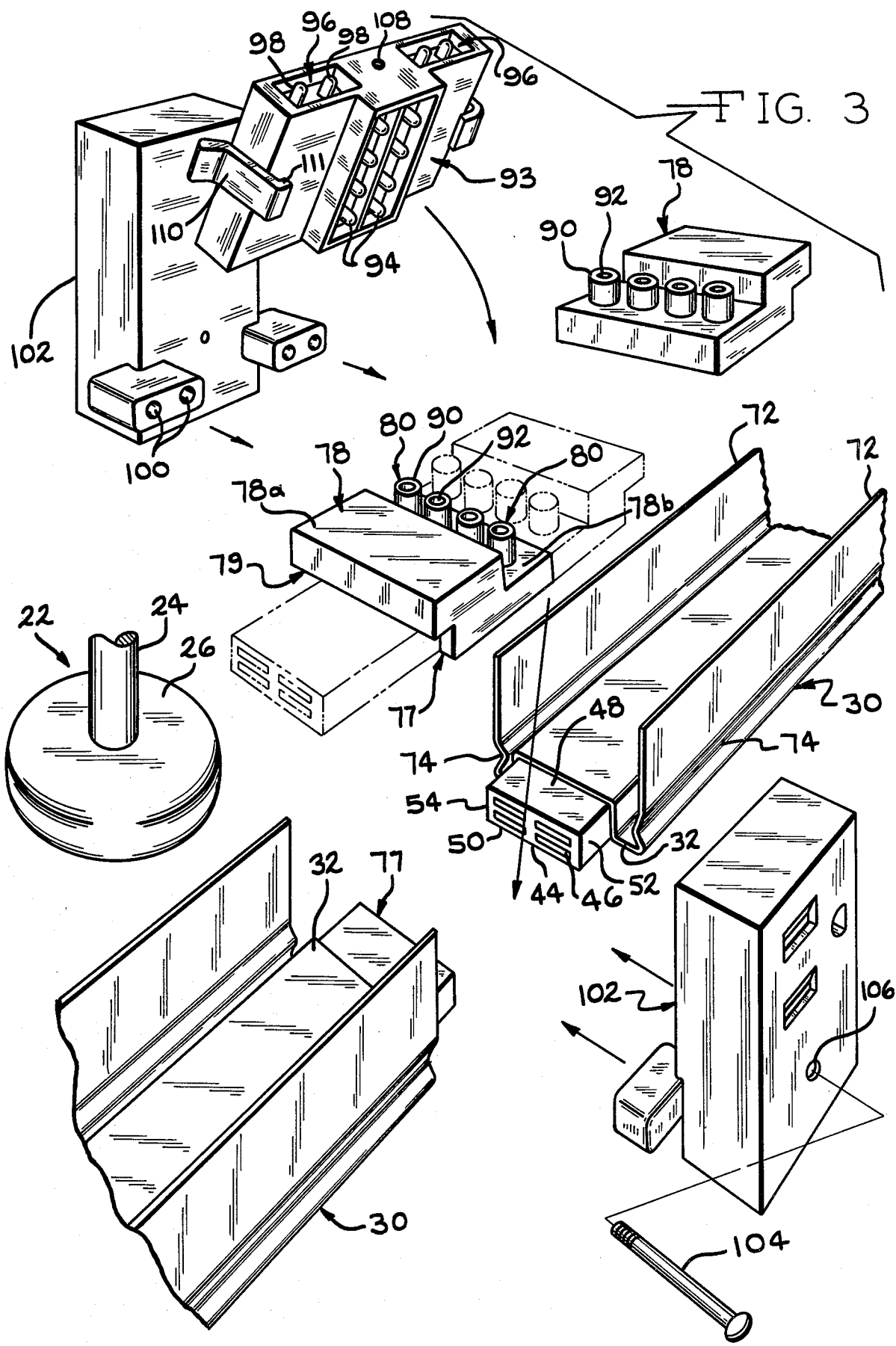
FIG. 3 is an exploded perspective view of the energy supply system of the present invention further illustrating connector assemblies for interconnecting a pair of flat cable units.

As seen in FIGS. 2-4, track means in the form of track members 30 are interposed between the leg supports 22 and the floor 16 to support the wall panels 14 on the floor 16 in positions in which their lower edges 20 are spaced above the floor 16 to establish clearances 31 below the lower edges 20. Each track member 30 has a length that corresponds substantially to the length of its associated wall panel 14 and has ends 32 which terminate below and adjacent to the ends 18 of its associated wall panel 14. Each track 30 further includes a top surface 34 on which the leg supports 22 rest and a bottom surface 36 which engages the floor 16.

A centrally located longitudinally extending downwardly opening channel 38 is formed in the bottom surface 36 of the track 30. The channel 38 is defined by side wall 40 connected to a flat top wall 42 which positions the top surface 34 above the floor 16.

The channel 38 defines a compartment in which a flat cable unit 44 is disposed. The flat cable unit 44 rests on the floor 16 and has a height that corresponds with the vertical height of the compartment 38 above the floor 16 so as to substantially fill the compartment 38. The flat cable unit 44 comprises stacked side-by-side flat conductors 46 embedded in a suitable insulating medium such as vinyl or polypropylene whose outer surface defines a rectangle in a transverse plane extending through the cable unit 44. Thus, the cable unit 44 has wide top and bottom surfaces 48 and 50 and relatively short sides 52 and 54. The flat cable unit 44 can be easily installed and removed from its concealed position beneath the track 30 merely by lifting the entire track 30 from the floor.

Side cover members 56 are mounted on the tracks 30 to conceal the space 31 between the lower edge 20 of the wall panel 14 and the track 30. The space 31 is utilized to house communications lines such as the telephone cables 60 and 62. The telephone cable 60 is secured to the leg support 22 by a clamp 64 which is mounted on the spindle 24. The cover member 56 comprises an upright body 66 having an inner surface 68 from which an inwardly and downwardly extending hook portion 70 projects. The track 30 has side plates 72 which engage the hook portions 70 to maintain the side cover members 56 in upright positions concealing the space 31. A longitudinally extending horizontal recess 74 is formed in the plate 72 near the bottom surface 36 of the track 30 and receives an inwardly extending projection 76 that cooperates with the recess 74 to inhibit the up and down movement of the side cover member 56. Accordingly, an upwardly directed force must be applied to the side cover member 56 to remove it from the track 30 sidewall 72 of the track 30.

As seen in FIG. 3, each flat cable unit 44 terminates in opposite ends 77 to which connector assemblies 78 are attached. The length of each flat cable unit 44 corresponds with the length of its associated track member 30 so that the connector assemblies 78 are positioned adjacent the ends 32 of the track members 30. Each connector assembly 78 comprises four upright prong receiver contacts 80 which are positioned in a side by side relationship transversely across the connector assembly 78. Each prong receiver 80 comprises a cylinder 90 having a metallic inner liner 92 connected to a corresponding conductor 46.

As seen in FIG. 4, a pair of adjacent flat cable units 44 are positioned at the juncture of a pair of wall panels 14 where the connector assemblies 78 are disposed adjacent to each other. A jumper connector 93 having two rows of side-by-side downwardly extending metallic prongs 94 is operable to connect the adjacent connector assemblies 78 together. The prongs 94 insert into their associated cylinders 90 establishing electrical continuity between the adjacent cable units 44 and also mechanically securing the cable units 44 together. The jumper connector 93 has side outlets 96 consisting a pair of prongs 98 which are inserted into corresponding prong receiver openings 100 provided on each of the receptacle outlets 102. The receptacle outlets 102 are secured to the jumper connectors 93 by means of a screw 104 which extends through a hole 106 formed through the receptacle outlet 102 and into a threaded opening 108 formed in the jumper connector 93.

The connector assemblies 78 each have a step configuration formed by an upper step 78a and a lower step 78b with the prongs receivers 80 extending upwardly from the lower step 78b. The upper step 78a has a clearance formed therebelow. Latch members 110 are pivotally mounted on the jumper connectors 93 at opposite ends thereof and have arms 111 movable into engagement with the underside of the top step 78a to hold the adjacent connector assemblies 78 together and to secure the jumper connector 93 in a fixed position.

As seen in FIG. 1, a modified track 230 is provided having a channel 238 formed in the bottom surface 236 of the track 230 to extend longitudinally thereof. A modified flat cable unit 244 is provided with flat conductors 246 in which all are positioned side by side in horizontal alignment so as to provide a cable unit 244 that is flatter than the cable unit 44. The channel 238 which forms the compartment in which the flat cable unit 244 is disposed is defined by upright side walls 240 and a top wall 242.

An undercover plate 250 having a bottom surface 252 snaps into compartment 238 to enclose the compartments. The undercover plate 250 has upright side walls 254 that are biased transversely outwardly with respect to the undercover plate 250 so as to frictionally engage the side walls 240 when the plate 250 is installed in the channel 238. When the plate 250 is fitted in its closed position, its bottom surface 252 is substantially flush with the bottom surface 236 of the track 230. Employment of the undercover plate 250 thereby serves to retain the cable 244 in the compartment 238 when the track 230 is lifted from the floor. Accordingly, the track 230 and the cable 244 can be moved as a unit.

Figure 5:
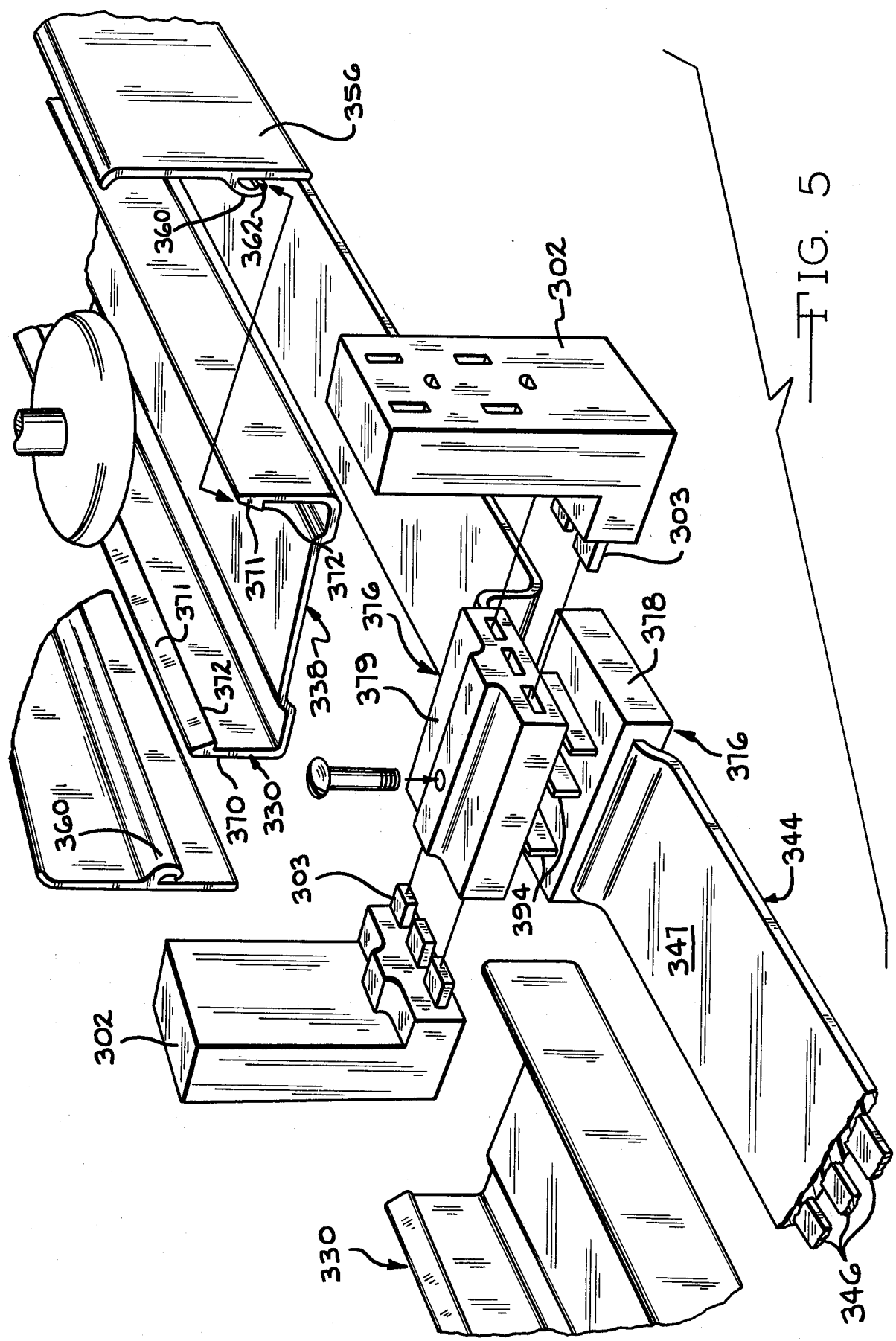
FIG. 5 is an exploded perspective view of the energy supply system of this invention showing flat cable units having modified connector assemblies.

Another form of the energy supply system of this invention is illustrated in FIGS. 5 and 6. A flat cable unit 344 consists of three side-by-side conductors 346 disposed in a flat body 347 of insulating material. Tracks 330 are provided, each having a downwardly opening and longitudinally extending channel 338 on its underside which forms a compartment in which the cable unit 344 is disposed. Each cable unit 344 terminates at one end 376 in a connector assembly 378 and at its opposite end 376 in a connector assembly 379. The connector assembly 378 has upright flat prongs 394 positioned side by side and the connector assembly 379 has corresponding female prong receivers (not shown). The connector assembly 379 for one flat cable unit 344 is positioned on top of and plugged into the connector assembly 378 on the adjacent cable unit 344 to electrically and mechanically interconnect the two flat cable units 344. Receptacle outlets 302 having horizontally aligned prongs 303 are attachable to the connector assembly 379 by insertion of prongs 303 into corresponding flat openings formed in the connector assembly 379 to face transversely of the cable units 344.

The track members 330 each have transversely spaced upright walls 370 which terminate at their upper portions in downwardly and inwardly inclined walls 371 ending at downwardly facing ledge 372. Side cover members 356 are provided having downwardly and inwardly turned resilient hook portions 360 each of which has an upwardly facing flat ledge 362. Installation of the side cover members 356 is accomplished by lowering the side cover members 356 on the tracks 330 so that the hooks portions 360 engage the upper ends of the walls 370. As the side cover member 356 is lowered, the hook portion 360 rides on the inclined wall 371 and is urged outwardly from the side cover member 356. When the side cover member 356 is lowered in place, the hook portion 360 snaps back to its normal position placing the ledges 362 and 372 in interferring relationship to inhibit the upward displacement of the side cover member 356 from the track member 330 on which it is mounted.

Another form of the energy supply system is shown in FIGS. 7 and 8 whereby a flat cable unit 444 having side-by-side flat conductors 446 embedded in insulation is positioned on its side. As used herein with respect to the flat cable units, the term side-by-side refers to the position of the flat conductors within the cable unit irrespecitve of whether the cable unit is positioned to lay flat or on its side. The cable unit 444 has a bead portion 448 which is received by a longitudinally and upwardly opening trough 450 formed in a track 430. The trough 450 has a reduced neck portion 452 to maintain the flat cable unit 444 in an upright position and inhibit the upward movement of the cable unit 444 from trough 450. A similar trough 450 is provided on the opposite side of the track to support another cable unit 444 if required.

The compartment 438 in which the flat cable unit 444 is disposed is defined by side cover members 456 which mount on the track 430 and extend upwardly into engagement with the wall panel 14. The cable unit 444 extends above the lower edge 20 of the panel 14 and is positioned adjacent the face of the panel 14. The compartment 438 is thereby defined by the space provided by the side cover members 456 and the tracks 430 in cooperation with the wall panel 14. Positioning the cable 444 on its side, as shown in FIGS. 7 and 8, allows it easily to be bent around corners. The remaining space in the compartment 438 is thus available for housing communications cables and auxiliary power lines, if the need should arise. Each side cover member 456 has a downwardly and inwardly extending hook portion 460 terminating in an enlarged head portion 462. The track 430 has parallel channels 464 on opposite sides extending in longitudinal directions. The channels 464 open upwardly and have reduced necks 466 to restrain upward displacement of the hook 460 from the channel 464.

Connector assemblies 478, similar to the connector assemblies 78 are provided at the opposite ends of each flat cable unit 444. A combination jumper connector and receptacle outlet 479 is provided to interconnect the adjacent flat cable units 444 and to provide an outlet for lights or electrical appliances. The connector outlet 479 can be secured to the connector assemblies 478 by means of screws 480 (one shown) to positively secure the connector assemblies 478 together. The receptacle outlet 479 has vertically aligned prongs 481 which are inserted into associated prong receiver cylinders 482 which extend transversely from the connector assemblies 478 and which are also vertically aligned.

From the above description, it can be seen that an improved energy supply system is provided employing compact flat cable units which efficiently utilize the available space provided adjacent the lower edges of the wall panels in a space divider system.

It is claimed:

1. In a portable space divider system comprised of a plurality of movable upright wall panels arranged end-to-end on a supporting surface, each of said panels having upright ends and a lower edge extending longitudinally between said ends, movable track means associated with each of said wall panels, said track means having top and bottom surfaces and being positioned on said supporting surface to support said associated wall panel in a position in which said lower edge of said panel is spaced above said supporting surface, means forming a longitudinal channel in the bottom surface of said track means, said channel defining a downwardly opening compartment defined by side and top wall portions on said track means, a generally flat cable unit comprised of a plurality of side-by-side conductors disposed in an insulating medium, said flat cable unit being positionable on said supporting surface so as to be disposed in said compartment to extend longitudinally of said wall panel between the ends thereof, said flat cable unit and said compartment having selected heights that are substantially equal so that said flat cable unit substantially spans the distance between said supporting surface and said top wall portion.

2. The energy supply system according to claim 1, wherein said track means has a length corresponding to the length of said associated panel and terminates at ends adjacent the upright ends of said associated panel, and further including a pair of connector assemblies connected to said conductors at opposite ends of said flat cable units and mounted adjacent said ends of said track means enabling the connection of said flat cable unit to a similar flat cable unit associated with another wall panel.

3. In a space divider system comprised of a plurality of upright wall panels arranged end-to-end on a supporting surface, each of said panels having upright ends and a lower edge extending longitudinally between said ends, track means associated with each of said wall panels, said track means having top and bottom surfaces and being positioned on said supporting surface to support said associated wall panel in a position in which said lower edge is spaced above said supporting surface, means forming a longitudinal channel in the bottom surface of said track means, said channel defining said compartment, a generally flat cable unit comprised of a plurality of side by side conductors disposed in an insulating medium, said flat cable unit being disposed in said compartment to extend longitudinally of said wall panel between the ends thereof, cover plate means engageable with said track means substantially to enclose said compartment in which said flat cable unit is disposed, said cover plate means comprising a plate member having an outer surface positioned in covering relationship with said channel to be substantially flush with said bottom surface of said track means when located in a closed position over said channel, a pair of connector assemblies connected to said conductors at opposite ends of said flat cable unit and located adjacent the upright ends of said panel at the lower edge thereof enabling the connection of said flat cable unit to a similar flat cable unit associated with another wall panel.

4. In a space divider system comprised of a plurality of upright wall panels arranged end-to-end on a supporting surface, each of said panels having upright ends and a lower edge extending longitudinally between said ends, means extending longitudinally of each of said panels forming a compartment adjacent the lower edge thereof, a generally flat cable unit comprised of a plurality of side by side conductors disposed in an insulating medium, said flat cable unit being disposed in said compartment to extend longitudinally of said wall panel between the ends thereof, track means associated with each of said upright wall panels, said track means being positioned on said supporting surface to support said associated wall panel in a position in which the lower edge thereof is spaced above said supporting surface, retaining means on said track means extending longitudinally thereof for supporting in said compartment said flat cable unit in an upright position in which said side-by-side conductors are located in generally vertically spaced positions, a pair of connector assemblies connected to said conductors at opposite ends of said flat cable unit and located adjacent the upright ends of said panel at the lower edge thereof enabling the connection of said flat cable unit to a similar flat cable unit associated with another wall panel.

5. The energy supply system according to claim 4, wherein said retaining means is positioned transversely of said associated upright wall panel enabling said flat cable unit to extend upwardly above the lower edge of said wall panel.

6. The energy supply system according to claim 4, and further including side cover means supported on said track means and extending upwardly therefrom into engagement with said upright panel to define said compartment in which said flat cable unit is disposed.

7. The energy supply system according to claim 5, wherein said retaining means comprises means forming an upwardly opening channel extending longitudinally of said track, said flat cable unit being disposed in said channel in said upright position.

* * * * *